June 11, 1929.　　　S. R. BERGMAN　　　1,716,614
ELECTRIC WELDING
Original Filed Aug. 4, 1925
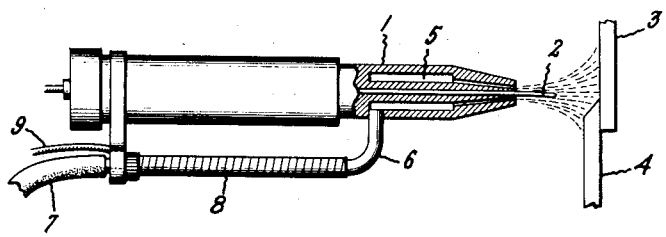
Inventor:
Sven R. Bergman,
by　*Alexander S. ____*
His Attorney Patented June 11, 1929.

1,716,614

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

ELECTRIC WELDING.

Application filed August 4, 1925, Serial No. 48,152. Renewed October 6, 1927.

My invention relates to electric arc welding apparatus adapted to produce a weld between metal parts in a gaseous medium, and has for its principal object the provision of means for reducing the amount of gas required to produce a strong and ductile weld by means of such apparatus. A further object is to provide a simple and effective means for preheating a gas or vapor in electric welding of this type.

It is well known that the electric arc welds produced in air are characterized by a lack of ductility. This brittleness or lack of ductility has been ascribed to various causes. It seems to be the result of compounds formed when the weld metal is subjected to the extremely high temperature of the electric arc in the presence of certain gases. It has been found, for example, that the weld metal is brittle when it is oxidized or contains nitrides, that welds made in an atmosphere of carbon dioxide or illuminating gas are likewise lacking in ductility; while welds made in pure hydrogen or certain other gases or gaseous mixtures for example mixtures of hydrogen with another gas such as carbon monoxide or argon are strong and possess great ductility. Welding in and with hydrogen is disclosed and broadly claimed in the applications of Peter P. Alexander Serial No. 758,082, filed December 26, 1924, for methods and apparatus for electric arc welding, and Irving Langmuir Serial No. 729,185, filed July 30, 1924, for heating process and apparatus. Welding in mixtures of hydrogen with another gas such as carbon monoxide or argon is disclosed and claimed in the applications of Elihu Thomson Serial No. 52,680, filed August 26, 1925, for electric welding and Philip K. Devers Serial No. 118,605, filed June 25, 1926, for arc welding. All these cases are assigned to the same assignee as the present application. The cost of these gases, however, is fairly high and their use therefore considerably increases the total cost of the welding operation. In accordance with my invention, the amount of gas utilized in a given welding operation is greatly reduced by preheating it to increase its volume. A further advantage of preheating the gas applied to the arc and to the molten portion of the parts to be welded is that the amount of heat produced by the combustion of gas surrounding the arc is reduced due to the low density of the gas and distortion of the work is largely avoided. Where gases, such as hydrogen, which have a high heat capacity, are used, preheating has a further important advantage in that chilling is greatly reduced.

My invention will be better understood from the following description when considered in connection with the accompanying drawing and its scope will be pointed out in the appended claims.

Referring to the drawing, the single figure thereof shows a welding apparatus wherein my invention has been embodied.

The figure shows a welding apparatus comprising an electrode discharge nozzle 1 through which a fusible welding electrode 2 may be fed by any suitable means at a rate dependent on the rapidity of its consumption. In the arrangement illustrated the weld is produced by an arc between the electrode and the work, shown as plates 3 and 4. It will be observed that the discharge nozzle 1 contains an annular chamber 5 which is adapted to be connected to a source of hydrogen or other suitable gas through pipe 6 and flexible tube 7 for ensuring that a ductile weld is produced between the parts 3 and 4, and that the pipe 6 is provided with a heating coil 8 adapted to be connected through leads 9 to a source of current for preheating the gas to increase its volume as previously explained. While I have described a particular type of apparatus, it should be understood that the advantages of my invention are not limited to this apparatus but may be realized in any type of welding apparatus designed to preheat a gas in order to reduce the rate of its consumption in producing a ductile weld. The apparatus may also be used for vaporizing a suitable liquid medium to produce a vapor of the desired density.

I have found that the consumption of hydrogen, for example, in an open flame of a definite size may be reduced one-half by preheating it to a temperature of about 300 degrees centigrade, and that hydrogen at this reduced density is entirely capable of ensuring the production of a strong and ductile weld. This reduction in the amount of gas required to perform the welding operation is particularly advantageous where the cost of the gas is high. It has also the advantage of greatly lengthening the time interval during which a single gas container is used. This greatly reduces the cost of transportation of gas containers.

The embodiment of the invention illustrated and described herein has been selected for the purpose of clearly setting forth the principles involved. It will be apparent, however, that the invention is susceptible of being modified to meet the different conditions encountered in its use. I therefore aim to cover by the appended claims all modifications within the true spirit and scope of my invention.

What I claim as new and desire to secure by Letters Patent of the United States, is:

1. The method of electric welding which comprises maintaining an arc to heat the parts to be welded, preheating a gaseous medium to increase its volume, and applying said gaseous medium to said arc and the molten portion of said parts whereby the amount of said gas consumed in the welding operation is reduced.

2. A welding apparatus wherein an electric arc is utilized to produce a weld between the parts to be united, comprising means for applying a gas to said arc and to the molten portion of said parts, and means for preheating said gas to increase its volume whereby the amount of said gas consumed in the welding operation is reduced.

3. The method of electric arc welding which comprises maintaining an arc between a welding electrode and the parts to be welded, preheating a gas to increase its volume, and surrounding said arc and the molten portion of said parts with said gas whereby the amount of said gas consumed in the welding operation is reduced.

4. The method of electric arc welding which comprises maintaining an arc between a welding electrode and the parts to be welded, preheating a gaseous medium comprising hydrogen to increase its volume, and applying said gaseous medium to said arc and the molten portion of said parts whereby the amount of gas consumed in the welding operation is reduced and a ductile weld between said parts is produced.

5. A welding apparatus comprising means for controlling an electrode, means for delivering a gaseous medium and an electric heater for preheating the medium.

6. The method of electric welding which comprises maintaining an arc to heat the parts to be welded, preheating a welding medium to increase its volume, and supplying said heated medium to said arc and the molten portion of said parts.

7. An apparatus for electric arc welding comprising an electrode delivery means, means for discharging a fluid medium to surround the arc and molten portions of the work and means for heating said medium prior to its delivery from the apparatus.

In witness whereof, I have hereunto set my hand this 31st day of July, 1925.

SVEN R. BERGMAN.